United States Patent
Seo et al.

(10) Patent No.: US 10,664,459 B2
(45) Date of Patent: May 26, 2020

(54) DATABASE MANAGING METHOD, DATABASE MANAGING SYSTEM, AND DATABASE TREE STRUCTURE

(71) Applicant: NAVER CORPORATION, Seongnam-si (KR)

(72) Inventors: Kyung Sik Seo, Seongnam-si (KR); Gab Young Kim, Seongnam-si (KR); Ki Yeul Lee, Seongnam-si (KR)

(73) Assignee: NAVER Corporation, Seongnam-si (KR)

( * ) Notice: Subject to any disclaimer, the term of this patent is extended or adjusted under 35 U.S.C. 154(b) by 753 days.

(21) Appl. No.: 14/513,921

(22) Filed: Oct. 14, 2014

(65) Prior Publication Data
US 2015/0106380 A1    Apr. 16, 2015

(30) Foreign Application Priority Data

Oct. 15, 2013    (KR) .................. 10-2013-0122951

(51) Int. Cl.
*G06F 16/22* (2019.01)
*G06F 16/2455* (2019.01)
*G06F 16/31* (2019.01)
*G06F 16/438* (2019.01)

(52) U.S. Cl.
CPC ...... *G06F 16/2246* (2019.01); *G06F 16/2455* (2019.01); *G06F 16/316* (2019.01); *G06F 16/438* (2019.01)

(58) Field of Classification Search
USPC ........................................................ 707/741
See application file for complete search history.

(56) References Cited

U.S. PATENT DOCUMENTS

| | | | |
|---|---|---|---|
| 5,812,996 A * | 9/1998 | Rubin ................. | G06F 12/0866 |
| 6,584,459 B1 * | 6/2003 | Chang ............... | G06F 17/30011 707/812 |
| 7,693,824 B1 * | 4/2010 | Diament .......... | G06F 17/30011 707/999.003 |
| 8,180,763 B2 * | 5/2012 | Freedman ......... | G06F 17/30961 707/713 |
| 8,255,398 B2 | 8/2012 | Bhattacharjee et al. | |

(Continued)

FOREIGN PATENT DOCUMENTS

| JP | 9-167111 | 6/1997 |
|---|---|---|
| JP | 2004-62475 | 2/2004 |

(Continued)

OTHER PUBLICATIONS

Korean Notice of Allowance issued in corresponding Korean patent application No. 10-2013-0122951, dated Jul. 6, 2015.

(Continued)

*Primary Examiner* — Tamara T Kyle
*Assistant Examiner* — Raheem Hoffler
(74) *Attorney, Agent, or Firm* — Greer Burns & Crain Ltd.

(57) ABSTRACT

Provided are a database (DB) managing method and system, wherein, while forming an index of a DB, a lower value and an upper value of key values of a plurality of records included in one page are stored as separators and an overlapping part of the key values is deleted from the plurality of records by using the separators to save a storage space where pages of the index is stored, and thus the performance of the DB is improved.

16 Claims, 7 Drawing Sheets

(56) References Cited

U.S. PATENT DOCUMENTS

| | | | |
|---|---|---|---|
| 8,364,711 B2 * | 1/2013 | Wilkins | G06Q 10/10 |
| | | | 707/783 |
| 2003/0204513 A1 * | 10/2003 | Bumbulis | G06F 17/30327 |
| 2008/0065596 A1 * | 3/2008 | Shadmon | G06F 16/81 |
| 2008/0126298 A1 | 5/2008 | Kang et al. | |
| 2009/0164415 A1 | 6/2009 | Lee et al. | |
| 2010/0082545 A1 * | 4/2010 | Bhattacharjee | G06F 16/328 |
| | | | 707/641 |
| 2010/0145976 A1 | 6/2010 | Higgins et al. | |
| 2013/0238576 A1 | 9/2013 | Binkert et al. | |

FOREIGN PATENT DOCUMENTS

| | | |
|---|---|---|
| JP | 2008-130084 | 6/2008 |
| KR | 10-2009-0067825 A | 6/2009 |
| KR | 10-2009-0085869 | 8/2009 |
| TW | 201030544 A1 | 8/2010 |

OTHER PUBLICATIONS

Japanese office action issued in corresponding Japanese patent application No. 2014-209249, dated Sep. 29, 2015.
Office Action issued in corresponding Taiwanese patent application No. 103135611, dated Dec. 11, 2015.
Korean Office Action issued in Korean patent application No. 10-2013-0122951, dated Jan. 19, 2015.

* cited by examiner

| KR10000 : FD0001 : SN10000 |
| KR10000 : FD0001 : SN10001 |
| KR10000 : FD0001 : SN11000 |
| KR10000 : FD0001 : SN11050 |
| KR10000 : FD0001 : SN12000 |
| KR10000 : FD0001 : SN13333 |
| KR10000 : FD0001 : SN13700 |
| KR10000 : FD0001 : SN17600 |
| KR10000 : FD0001 : SN20100 |
| KR10000 : FD0001 : SN20340 |

} PAGE 2

DATABASE MANAGING METHOD, DATABASE MANAGING SYSTEM, AND DATABASE TREE STRUCTURE

RELATED APPLICATION

This application claims the benefit of Korean Patent Application No. 10-2013-0122951, filed on Oct. 15, 2013, in the Korean Intellectual Property Office, the disclosure of which is incorporated herein in its entirety by reference.

BACKGROUND

1. Field

One or more embodiments of the present invention relate to a database (DB) managing method, a DB managing system, and a DB tree structure, and more particularly, to a DB managing method, a DB managing system, and a DB tree structure, which use an index compression method.

2. Description of the Related Art

A database management system (DBMS) is a system for managing a database in which a massive amount of data is stored and is recognized to be an important and necessary element of the present age where a massive amount of information is constantly generated.

Such a DBMS stores data in the database in a form of a table. Here, the table is a basic structure for storing data in the database, and one table includes at least one record. Here, the record denotes one row of the table. Also, each record includes at least one column, wherein the column denotes a domain having a name of a table item of the real world and is also referred to as an attribute or a field.

When a certain query is input from an external source, the DBMS performs functions, such as selecting, inserting, updating, and deleting data with respect to the database, based on the input certain query. Here, a query is a description about a demand regarding data stored in the table of the database, i.e., about manipulation to be performed on the data, and is expressed by using a language, such as structured query language (SQL).

Due to the massive amount of data, the DBMS generally includes an index. Here, the index means a data structure that increases a search speed in the table in database fields, and such an index has a structure wherein data is in a {key value, pointer} pair so that data records (tuples) are quickly accessed.

Information disclosed in this Background section was already known to the inventors of the present invention before achieving the present invention or is technical information acquired in the process of achieving the present invention. Therefore, it may contain information that does not form the prior art that is already known to the public in this country.

SUMMARY

One or more embodiments of the present invention include a database (DB) managing method, a DB managing system, and a DB tree structure, wherein, while forming an index of a DB, a lower value and an upper value of key values of a plurality of records included in one page are stored as separators and an overlapping part of the key values is deleted from the plurality of records by using the separators to save a storage space where pages of the index is stored, and thus the performance of the DB is improved.

One or more embodiments of the present invention include a DB managing method, a DB managing system, and a DB tree structure, wherein compression is settable in run-time such that the compression is not performed when an insert/delete load is high in a certain region, and thus the efficiency of operating a DB is improved.

One or more embodiments of the present invention include a DB managing method, a DB managing system, and a DB tree structure, wherein metadata about a secondary compression method and a range is not required to be additionally recorded, and thus, compared to a general method, compression efficiency is improved, wherein meta information is included in records compressed as the number of records stored in a page increases.

One or more embodiments of the present invention include a DB managing method, a DB managing system, and a DB tree structure, wherein an error of an index structure is easily determined by performing a validity check on a leaf node by using a lower fence key (LFK) and a upper fence key (UFK) of each page whenever a tree structure of an index is traversed.

Additional aspects will be set forth in part in the description which follows and, in part, will be apparent from the description, or may be learned by practice of the presented embodiments.

According to one or more embodiments of the present invention, a database (DB) managing method includes: storing a lower value of key values of a plurality of records included in each page as a lower fence key (LFK) or an upper value of the key values of the plurality of records as an upper fence key (UFK); extracting a common region from the key values of the plurality of records included in each of the pages, as a prefix; and storing a remaining part obtained by excluding a part corresponding to the prefix from the key values of the plurality of records.

The prefix may be stored in the LFK or the UFK.

Key values obtained by excluding the prefix from original key values of the plurality of records may be stored in records, except for where the LFK or the UFK is stored.

Each of the plurality of records may be in a form of a multi-column comprising a plurality of key values.

A part of a key value that has a same value throughout records forming one page from among the plurality of key values may be extracted as the prefix.

Each of the pages may be a leaf node having a B tree or B+ tree structure.

The DB managing method may further include restoring original key values of the plurality of records included in each of the pages, wherein the restoring comprises: determining whether the LFK and the UFK exist in a relevant page; if the LFK and the UFK exist in the relevant page, comparing the LFK and the UFK to extract a prefix that is common between the LFK and the UFK; and restoring original key values by combining the extracted prefix and key values of a relevant record.

If the LFK and the UFK do not exist in the relevant page, key values stored in the each record may be original key values.

The DB managing method may further include adding a new record to each of the pages or changing a pre-existing record, wherein the adding or changing may include: determining whether the LFK and the UFK exist in a relevant page; if the LFK and the UFK exist in the relevant page, comparing the LFK and the UFK to extract a prefix that is common between the LFK and the UFK; and adding, to a record of the relevant page, remaining key values obtained by excluding the prefix from a record to be added or changing the record of the relevant page to remaining key values obtained by excluding the prefix from a record to replace the record of the relevant page.

If the LFK and the UFK do not exist in the relevant page, the prefix may not be extracted and a new record may be added to a relevant page or a pre-existing record of the relevant page may be changed.

According to one or more embodiments of the present invention, a database (DB) managing method includes: generating an index having a B tree or B+ tree structure; restoring a predetermined record in the index; and adding a new record to or changing the predetermined record in the index, wherein the DB has a B tree or B+ tree structure and the generating of the index includes storing, in at least one end of at least one leaf node, a lower value of key values in the at least one leaf node as a lower fence key (LFK) or an upper value of the key values in the at least one leaf node as an upper fence key (UFK).

According to one or more embodiments of the present invention, a database (DB) managing system includes: a query analyzer that receives and analyzes a query in which a fetch request for a record included in a certain table and an update request for at least one column included in the record are defined; an execution plan generator that generates an execution plan for performing the analyzed query; an execution plan execution unit that executes the execution plan by fetching the record and updating the at least one column according to the execution plan; and an index manager that includes an index generator generating an index regarding the certain table and storing a lower value of key values of a plurality of records included in each page of the index as a lower fence key (LFK) or an upper value of the key values of the plurality of records as an upper fence key (UFK).

The index generator may extract a common region from the key values of the plurality of records included in each of the pages, as a prefix.

The index generator may store a remaining part obtained by excluding a part corresponding to the prefix that is the common region from the key values of the plurality of records included in each of the pages.

The prefix may be stored only in the LFK or the UFK.

Key values obtained by excluding the prefix from original key values of the plurality of records may be stored in records, except for where the LFK or the UFK is stored.

The index manager may further include a record restorer that restores original key values from the plurality of records included in each of the pages of the index.

The record restorer may determine whether the LFK and the UFK exist in a relevant page, if the LFK and the UFK exist in the relevant page, compare the LFK and the UFK to extract the prefix, and restore the original key values by combining the extracted prefix and key values of a relevant record of the relevant page.

The index manager may further include a record updater that adds a new record to each of the pages of the index or changes a pre-existing record.

The record updater may determine whether the LFK and the UFK exist in a relevant page, if the LFK and the UFK exist in the relevant page, compare the LFK and the UFK to extract the prefix, and add, to a record of the relevant page, remaining data obtained by excluding the prefix from a record to be added or change the record of the relevant page to remaining data obtained by excluding the prefix from a record to replace the record of the relevant.

According to one or more embodiments of the present invention, a database (DB) tree structure having a B tree or B+ tree structure includes: a root node that is located at an uppermost layer of the B tree or B+ tree structure and stores at least one separation key value; and at least one leaf node that stores, in at least one end, a lower value of key values in the at least one leaf node as a lower fence key (LFK) or an upper value of the key values in the at least one leaf node as an upper fence key (UFK).

A record existing between the LFK and the UFK in the at least one leaf node may only store remaining key values obtained by excluding a common region from key values of the record.

The at least one separation key value stored in the root node may be an LFK of a neighboring leaf node or an UFK of another neighboring leaf node.

A leftmost leaf node of the at least one leaf node may not store the LFK and a rightmost leaf node of the at least one leaf node may not store the UFK.

BRIEF DESCRIPTION OF THE DRAWINGS

These and/or other aspects will become apparent and more readily appreciated from the following description of the embodiments, taken in conjunction with the accompanying drawings in which:

FIGS. 6 (*a*) and (*b*) are diagrams for describing a process of splitting a page in a B tree index to which a DB managing method and system are applied, according to an embodiment of the present invention.

DETAILED DESCRIPTION

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description.

Hereinafter, one or more embodiments of the present invention will be described in detail with reference to accompanying drawings, to be easily executed by one of ordinary skill in the art.

Figure 1A:
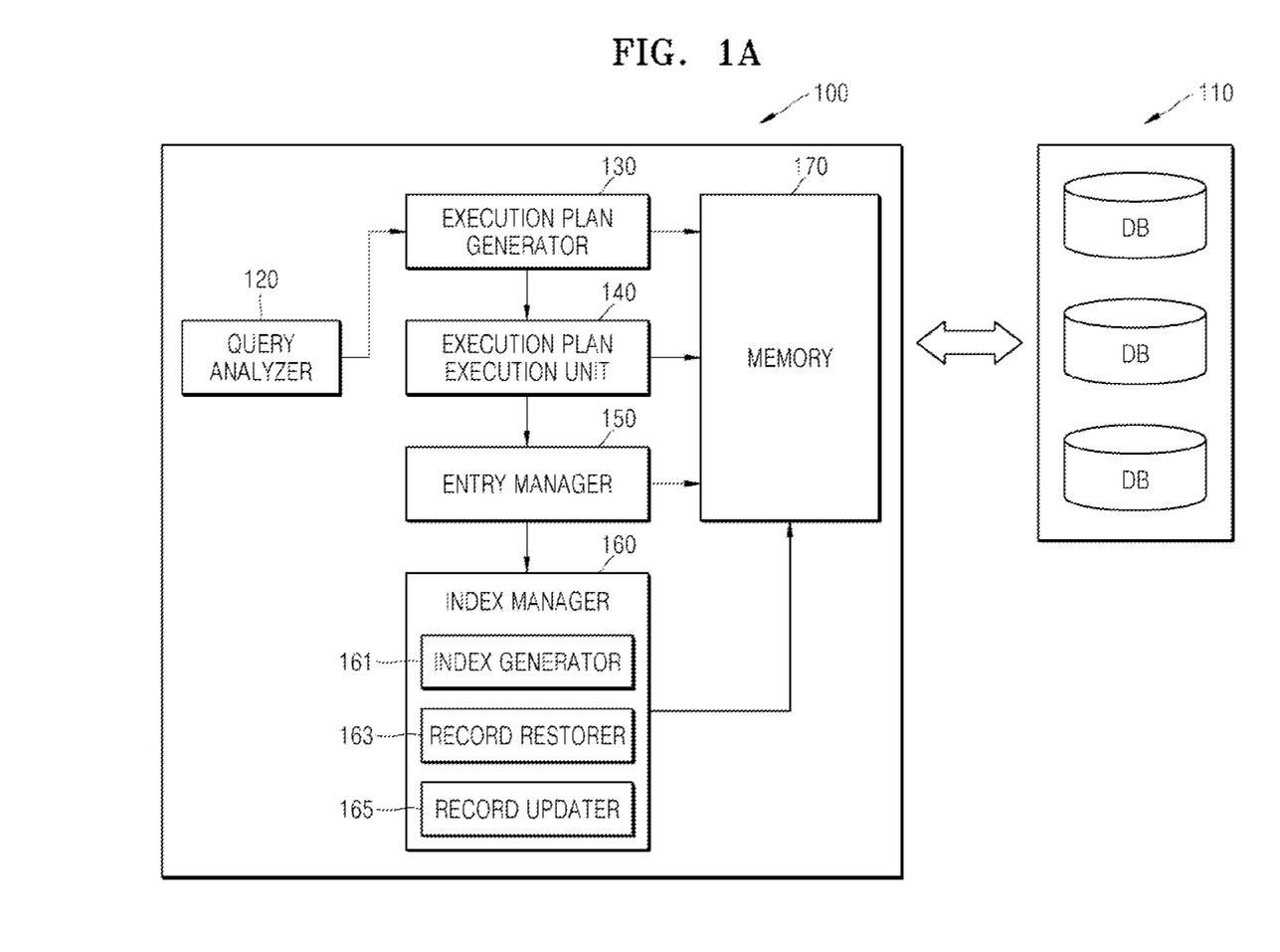
FIG. 1A is a schematic block diagram of a database (DB) managing system according to an embodiment of the present invention.

FIG. 1A is a schematic block diagram of a database (DB) managing system 100 according to an embodiment of the present invention. Referring to FIG. 1A, the DB managing system 100 according to an embodiment of the present invention is configured as follows.

First, various types of data are stored in a DB 110 in a form of a table, and as described above, each table includes at least one record, and each record includes at least one column. For example, when a DB stores bulletins on a predetermined bulletin board, a table denotes a group of bulletins, and a record denotes each bulletin, and a column denotes an area where a bulletin identifier, a bulletin writer, or a bulletin click-count is stored. In FIG. 1A, a plurality of the DBs 110 are included, but an embodiment of the present invention is not limited thereto, and the number and structure of the DBs 110 may vary according to a structure of the DB managing system 100, a stored data amount, and a purpose of the DB managing system 100.

The DB managing system 100 is connected to the DB 110 to systematically manage the DB 110, such as update or delete data recorded in the DB 110 or add data to the DB 110, and largely includes a query analyzer 120, an execution plan generator 130, and an execution plan execution unit 140. Also, the DB managing system 100 may further include an entry manager 150 and an index manager 160.

The query analyzer 120 receives a query for processing data stored in the DB 110 from any one of various external servers (not shown) or a manager terminal (not shown) interworking with the DB managing system 100, and analyzes the received query. Such a query analyzer 120 may include a query receiver and a parser, and may further include a validity verifier.

The execution plan generator 130 generates an execution plan for fetching a requested record and updating a column included in the requested record based on a parse tree determined to be valid by the validity verifier of the query analyzer 120, and stores the generated execution plan in a memory 170 that is described in detail later. Here, the execution plan denotes a data structure including a method of fetching a record from a certain table, a result record list, and information about whether to perform an adding operation on a column requested to be updated.

According to an embodiment, the execution plan generator 130 may select any one of a sequential scanning method and an index scanning method to fetch a requested record from a certain table. Here, a sequential scanning method fetches a record having an identifier of a requested record while sequentially scanning records included in a certain table, and the index scanning method fetches a requested record by only scanning a relevant index since an index is generated according to identifiers of records. An index of the DB managing system 100 will be described in detail later.

The execution plan execution unit 140 fetches the requested record from the certain table according to the execution plan generated by the execution plan generator 130, and updates a column value of the column requested to be updated by performing an adding operation on a column value recorded in a column on a record corresponding to a physical location of the column requested to be updated. In detail, the execution plan execution unit 140 generates a transaction for executing the execution plan generated by the execution plan generator 130 to process the generated execution plan during the transaction. Here, a transaction indicates one logical working unit, and is defined by using at least one structured query language (SQL) statement. By using such a transaction, data consistency and data concurrency may be guaranteed.

The DB managing system 100 may further include the entry manager 150 that generates or deletes an entry including an identifier of a record and an identifier of a column requested to be updated, and stores the generated entry in the memory 170 by matching the generated entry to a column value corresponding to a column identifier included in an entry), wherein the column value of the column requested to be updated may be matched to the entry generated by the entry manager 150, and stored in the memory 170.

Meanwhile, the DB managing system 100 may further include the index manager 160 that generates or deletes an index, and stores the generated index in the memory 170. The index manager 160 may include an index generator 161, a record restorer 163, and a record updater 165.

The index generator 161 generates an index regarding the DB 110, and at this time, a lower value of key values in each page of the index is stored as a lower fence key (LFK) and an upper value of the key values is stored as an upper fence key (UFK). Also, the index generator 161 extracts, as a prefix, a common region of key values of a plurality of records forming each of the pages. Then, the index generator 161 deletes a part corresponding to the prefix from the key values of the plurality of records included each of the pages, and then stores the key values in the index.

The record restorer 163 restores original key values from the record included in each page of the index. In detail, the record restorer 163 determines whether the LFK and the UFK exist in each page, and if the LFK and the UFK exist, extracts the prefix by comparing the LFK and the UFK and restores the original key values by combining the extracted prefix and the key values of the record.

The record updater 165 adds a new record to each page of the index or changes a pre-existing record. In detail, the record updater 165 determines whether the LFK and the UFK exist in each page, and if the LFK and the UFK exist, extracts the prefix by comparing the LFK and the UFK, and adds, to a record of a relevant page, remaining data obtained by excluding the prefix from a record to be added or change the record of the relevant page to remaining data obtained by excluding the prefix from a record to replace the record of the relevant page.

Figure 1B:
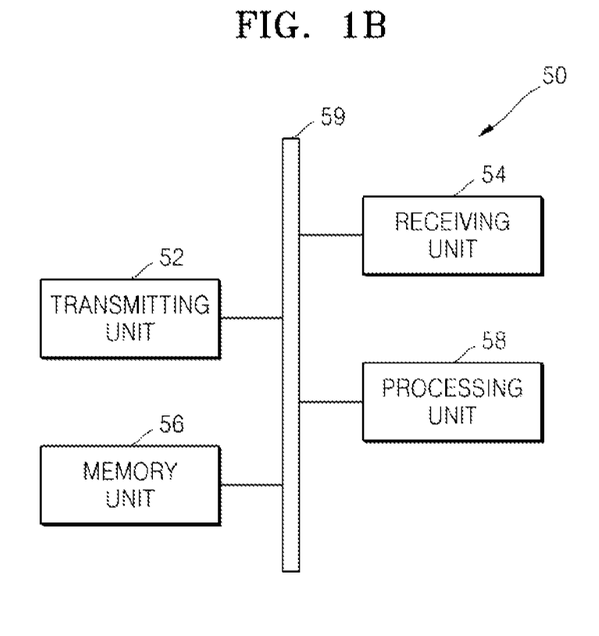
FIG. 1B is a block diagram illustrating an example structure of a computing device in which the DB managing system shown in FIG. 1 may be implemented according to one example embodiment.

The DB managing system 100 may be implemented in a dedicated computing or processing device or made part of an existing computing or processing device. The different components of the DB managing system 100 described above may be separate programs or functions that are executed by the computing or processing devices that implements the DB managing system. FIG. 1B is a diagram illustrating an example structure of a computing device 50 in which the DB managing system 100 may be implemented. The computing device 50 may include, for example, a data bus 59, a transmitting unit 52, a receiving unit 54, a memory unit 56, and a processing unit 58.

The transmitting unit 52, receiving unit 54, memory unit 56, and processing unit 58 are connected to one another via the data bus 59, and send data to and/or receive data from one another using the data bus 59.

The transmitting unit 52 is a device that includes hardware and any necessary software for transmitting signals including, for example, control signals or data signals via one or more wired and/or wireless connections to other network element.

The receiving unit 54 is a device that includes hardware and any necessary software for receiving wireless signals including, for example, control signals or data signals via one or more wired and/or wireless connections to other network elements.

The memory unit 56 may be any device capable of storing data including magnetic storage, flash storage, etc.

The processing unit 58 may be any device capable of processing data including, for example, a processor. The term 'processor', as used herein, refers to, for example, a hardware-implemented data processing device having circuitry that is physically structured to execute desired operations including, for example, operations represented as code and/or instructions included in a program. Examples of the above-referenced hardware-implemented data processing device include, but are not limited to, a microprocessor, a central processing unit (CPU), a processor core, a multiprocessor, an application-specific integrated circuit (ASIC), and a field programmable gate array (FPGA).

Hereinafter, a DB managing method using a separator-based index compression method will be described in detail.

Figure 2A:
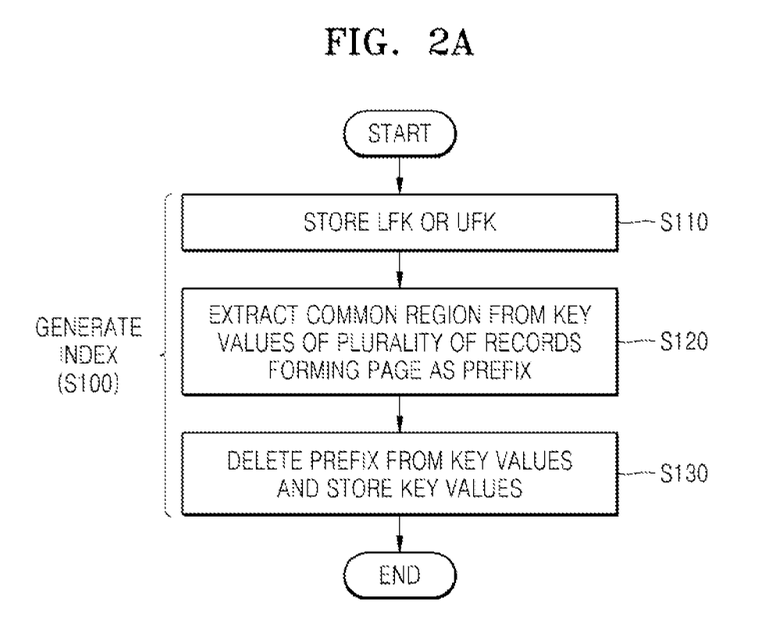
FIG. 2A is a flowchart illustrating generating of an index during a DB managing method, according to an embodiment of the present invention.
Figure 2B:
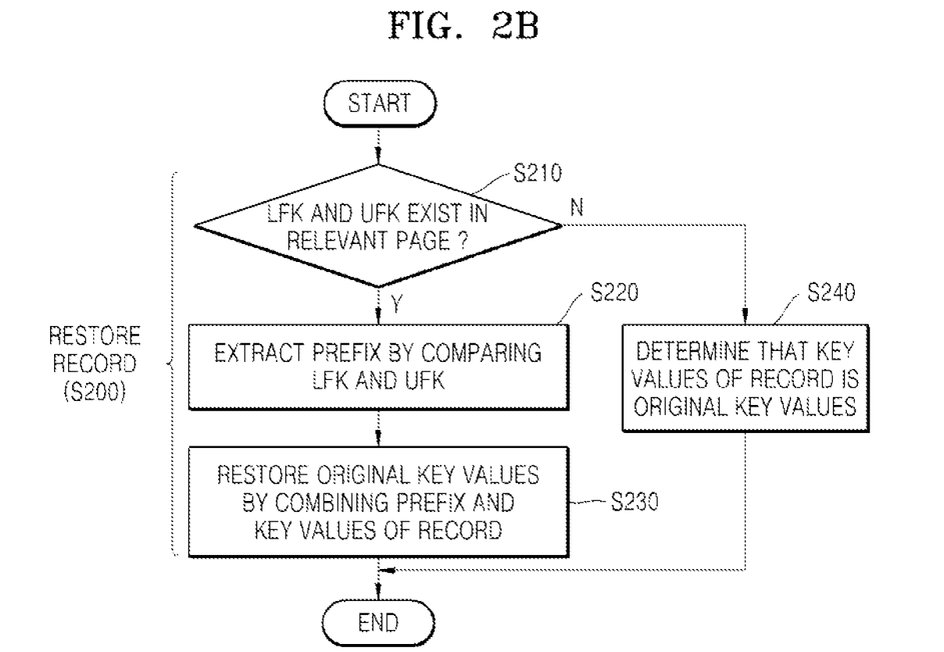
FIG. 2B is a flowchart illustrating restoring of a record during the DB managing method, according to an embodiment of the present invention.
Figure 2C:
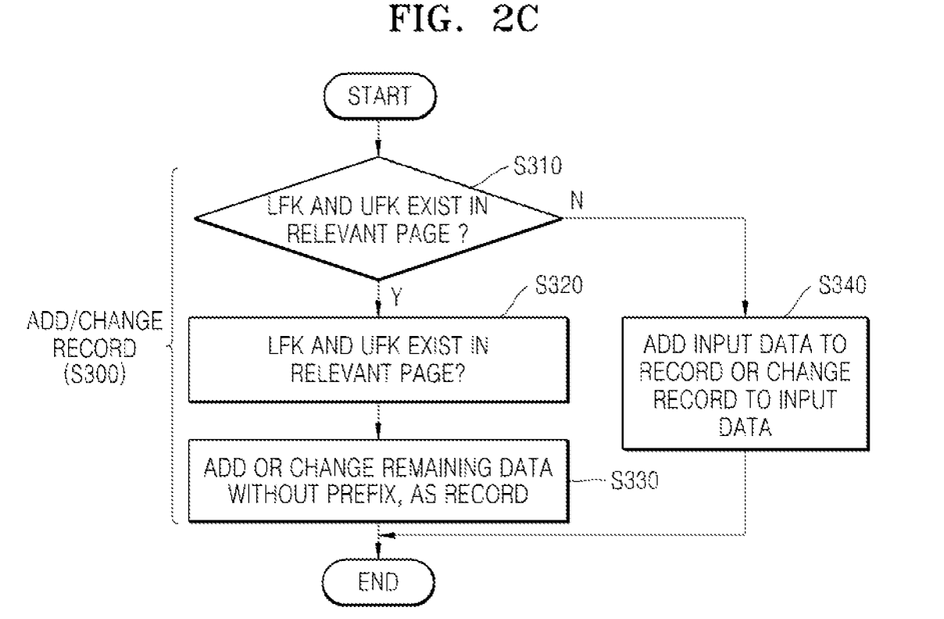
FIG. 2C is a flowchart illustrating adding/changing of the record during the DB managing method, according to an embodiment of the present invention.
Figure 3:
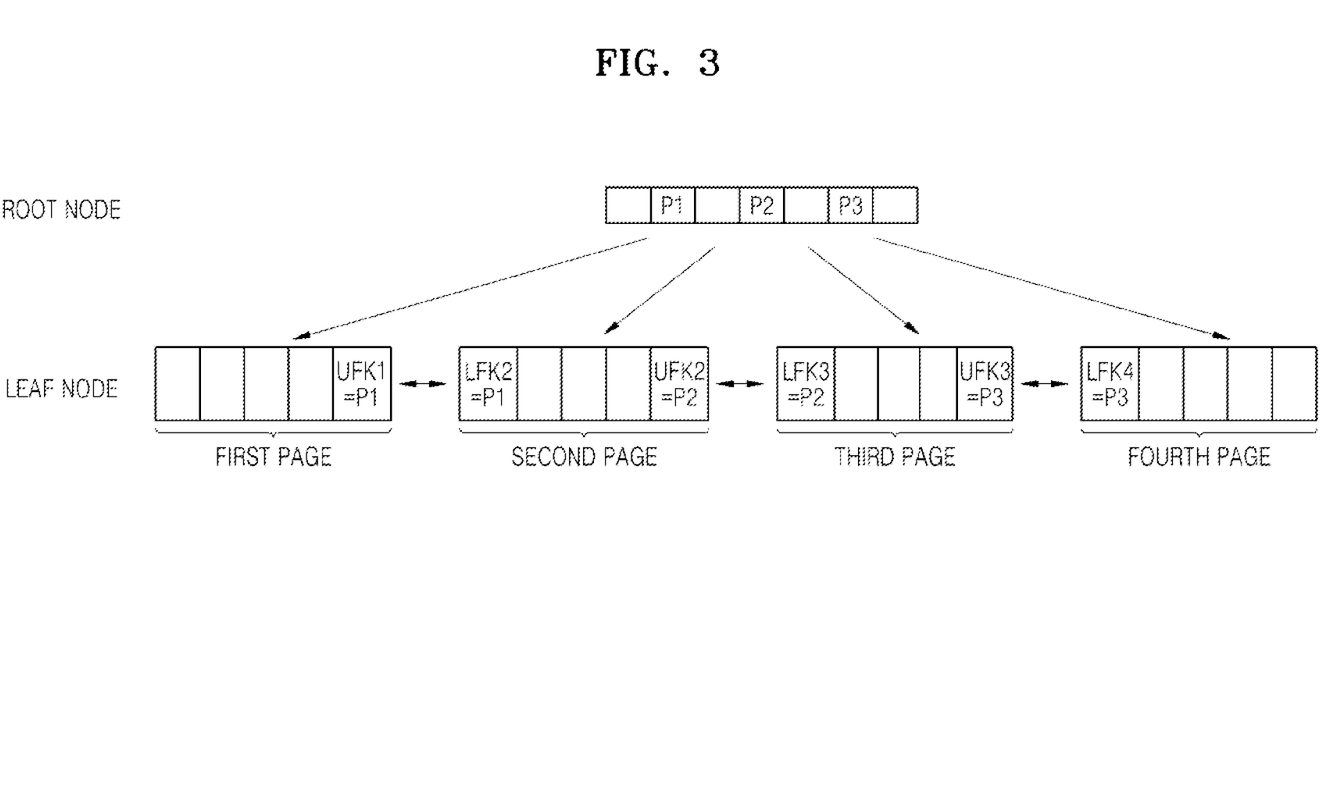
FIG. 3 is a diagram of a structure of B tree index to which a DB managing method and system are applied, according to an embodiment of the present invention.
Figure 4:
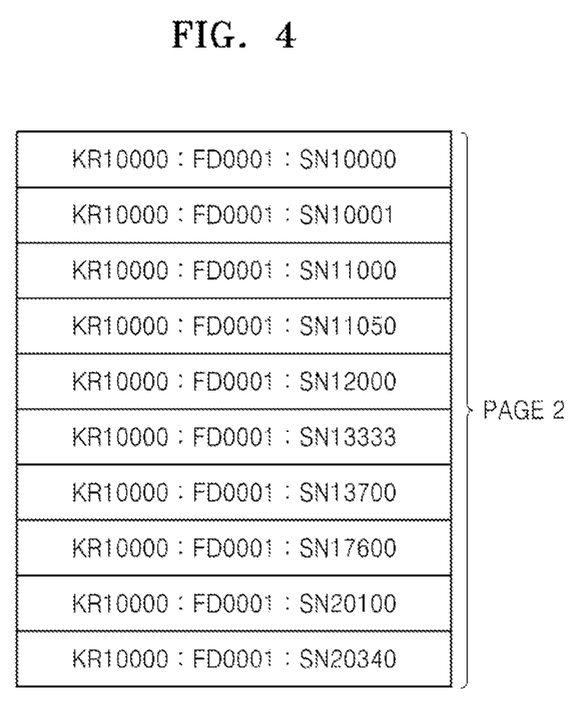
FIG. 4 is a diagram of an arrangement of key values of a general B tree page.
Figure 5:
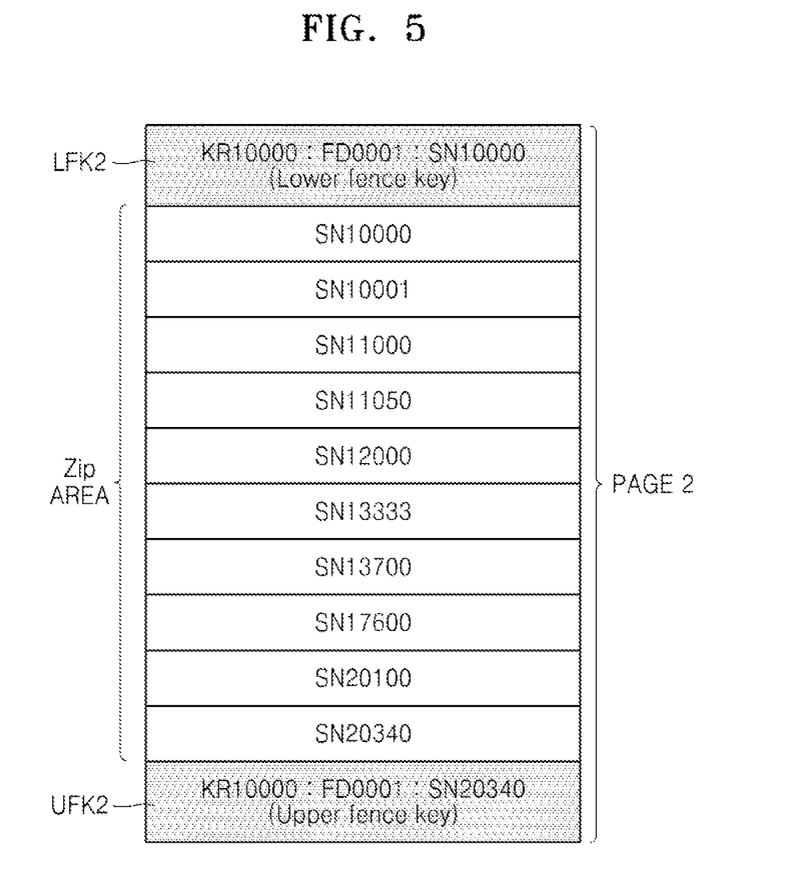
FIG. 5 is a diagram of an arrangement of key values of a B tree page according to a DB managing method and system, according to an embodiment of the present invention.

FIGS. 2A through 2C are flowcharts illustrating a DB managing method according to an embodiment of the present invention. FIG. 3 is a diagram of a structure of B tree index to which a DB managing method and system are applied, according to an embodiment of the present invention, FIG. 4 is a diagram of an arrangement of key values of a general B tree page, and FIG. 5 is a diagram of an arrangement of key values of a B tree page according to a DB managing method and system, according to an embodiment of the present invention.

Referring to FIGS. 2A through 5, a DB managing method according to an embodiment of the present invention includes generating an index (operation S100), restoring a record of the index (operation S200), and adding or changing the record of the index (operation S300).

The DB managing method will now be described in detail.

An index indicates a data structure that increases an operation speed regarding a table in DB fields. The index may be generated by using one column (a single column index) or several columns (multi-column index) in the table, and provides a base for not only a high speed search operation but also an efficient ordering operation with regard to accessing a record. A disk space required to store the index is generally smaller than that required to store the table because the index generally has a key and a field and does not have other detailed items of the table.

A B tree (or a B+ tree) is a type of a tree data structure widely used in a DB and a file system to form such an index, and is an associative mapping data structure for quickly inquiring into a record having a certain key value. Since data is recorded on a high capacity disk that is slowly accessed, the B tree (or the B+ tree) has a tree structure in page units to reduce numbers of input/output (I/O). Key values and locations (object identifiers or record identifiers) of actual records including the key values as attributes are recorded in one page in an order of the key values. In other words, an index record (also referred to as a record herein) is formed by combining {key-OID}.

Due to such characteristics, adjacent key values of a record in one page may be considerably similar. For example, when an identification (ID) number, a mail folder number, and a mail serial number are assigned as index keys for classifying mails in a mail system of a company (i.e., a multi-column index), and an employee has total 100,000 mails and 10,000 mails in one mail folder, the 10,000 mails have the same ID number and the same mail folder number and the 100,000 mails have the same ID number in an index. If 1,000 mails are recorded in one page of a general B tree according to a general method, the same ID number and the same mail folder number are repeatedly stored in about 10 pages. Accordingly, since same values are repeatedly stored, a memory is unnecessarily wasted.

Accordingly, a DB managing method and system, which use a separator-based index compression method, according to one or more embodiments of the present invention save a memory space by storing a prefix that is repeatedly stored from among key values of one page, in a lower fence key (LFK) and an upper fence key (UFK) that are separators.

Referring back to FIG. 2A, the generating of an index (operation S100) included in the DB managing method according to an embodiment of the present invention includes storing a lower value of key values in one page as an LFK or an upper value of the key values in one page as an UFK (operation S110), extracting a common region from the key values of a plurality of records forming the one page as a prefix (operation S120), and deleting the prefix from the key values and then storing the key values (operation S130).

Operation S100 will now be described in more detail.

Referring to FIG. 3 illustrating the structure of the B tree index, in an index used to quickly search for record data in a DB, the B tree index according to an embodiment of the present invention includes leaf nodes that indicate actual record data, and upper intermediate nodes. A root node is an uppermost node of the upper intermediate nodes. In FIG. 3, four leaf nodes and one intermediate node exist, and the one intermediate node is a root node. Here, each leaf node forms one page. In other words, the four leaf nodes form four pages in FIG. 3.

Here, the root node of the B tree index of FIG. 3 has first through third separation key values P1, P2, and P3. The first separation key value P1 is a separator separating a first page and a second page, the second separation key value P2 is a separator separating the second page and a third page, and the third separation key value P3 is a separator separating the third page and a fourth page.

As described above, the DB managing method according to an embodiment of the present invention stores a lower value of key values in each page as an LFK and an upper value of the key values in each page as an UFK. Here, in FIG. 3, the LFK is stored at a left end of each page to define the lower value of each page, and the UFK is stored at a right end of each page to define the upper value of each page.

Also, the DB managing method according to an embodiment of the present invention extracts a common region from key values of a plurality of records between the LFK and the UFK in each page as a prefix, deletes the prefix from the key values of the plurality of records except for the LFK and the UFK, and stores the remaining key values, thereby preventing repeated storage of data to save a memory space.

In other words, the first separation key value P1 is an UFK UFK1 of the first page and the same time, is an LFK LFK2 of the second page. Similarly, the second separation key value P2 is an UFK UFK2 of the second page and at the same time, is an LFK LFK3 of the third page. Similarly, the third separation key value P3 is an UFK UKF3 of the third page and at the same time, is an LFK LFK4 of the fourth page. Here, an LFK cannot be set for the leftmost leaf node (the first page) of the four leaf nodes, and thus a prefix is not extracted from the first page. Similarly, an UFK cannot be set for the rightmost leaf node (the fourth page) of the four leaf nodes, and thus a prefix is not extracted from the fourth page. In FIG. 3, every separation key value (P1, P2, P3) matches a UFK or an LFK of the leaf nodes, except the LFK of the leftmost leaf node and the UFK of the rightmost leaf node are not matched any separation key value.

For more detailed description, FIG. 4 illustrating the arrangement of the key values of the general B tree page, and FIG. 5 illustrating the arrangement of the key values of the B tree page according to an embodiment of the present invention are compared with each other. For convenience of description, it is assumed that there are only ten records.

Referring to FIG. 4, an ID number (KR10000) and a mail folder number (FD0001) are repeatedly stored ten times in ten records forming one page. On the other hand, referring to FIG. 5, according to the DB managing method of an embodiment of the present invention, the ID number (KR10000) and the mail folder number (FD0001) that are common in key values of one page are only stored only in an LFK setting a lower value of the page and in an UFK setting an upper value in the page, and key values from which a prefix is deleted are stored in other records excluding the LFK and the UFK. In other words, the ID number (KR10000) and the mail folder number (FD0001) that the common key values in the ten records are deleted and only mail serial numbers that are unique key values are stored in each record in FIG. 5.

The restoring of a record during the DB managing method according to an embodiment of the present invention will now be described in detail. Referring back to FIGS. 2B and 5, the restoring of a record (operation S200) includes determining whether an LFK and a UFK exist in a relevant page (operation S210, if the LFK and the UFK exist in the relevant page, extracting a prefix by comparing the LFK and the UFK (operation S220), and restoring original key values by combining the prefix and key values of a relevant record (operation S230). Operation S200 will now be described in more detail.

First, a page having key values to be restored is found via a binary search, and it is determined whether an LFK and an UFK exist in the page. If any of the LFK and the UFK does not exist in the page, the page is not compressed, i.e., overlapping data is not deleted by using a prefix, and thus it is determined that key values stored in each record of the page are original key values (operation S240). Meanwhile, if both the LFK and the UFK exist in the page, it is determined that the data is compressed by using a prefix in the page, and thus a predetermined restoration routine is performed. In other words, the LFK that is a lower value of the page and the UFK that is an upper value of the page are compared to extract a common region of the LFK and the UFK, i.e., a prefix. In FIG. 5, KR10000:FD0001 that is a common region of the LFK and the UFK may be extracted as a prefix. Then, original key values are restored by combining the extracted prefix to a key value of each record of the page. In other words, an original key value obtained by restoring SN10001 is KR10000:FD0001:SN10001.

The adding or changing of a record during the DB managing method according to an embodiment of the present invention will now be described in detail. Referring back to FIGS. 2C and 5, the adding or changing of a record (operation S300) includes determining whether an LFK and an UFK exist in a relevant page (operation S310), if the LFK and the UFK exist in the relevant page, comparing the LFK and the UFK to extract a prefix (operation S320), and adding, to a record of a relevant page, remaining data obtained by excluding the prefix from a record to be added or changing the record of the relevant page to remaining data obtained by excluding the prefix from a record to replace the record of the relevant page (operation S330). Operation S300 will now be described in more detail.

First, a page having key values to be added or changed is found via a binary search, and it is determined whether an LFK and an UFK exist in the page. If any of the LFK and the UFK does not exist in the page, the page is not compressed, i.e., overlapping data is not deleted by using a prefix, and thus a new key value is added to a key value of a relevant record or the key value of the relevant record is changed without any separate process (operation S340). Meanwhile, if both the LFK and the UFK exist in the page, it is determined that the data is compressed by using a prefix in the page, and thus a predetermined disassembling routine is performed. In other words, the LFK that is a lower value of the page and the UFK that is an upper value of the page are compared to extract a common region of the LFK and the UFK, i.e., a prefix. In FIG. 5, KR10000:FD0001 that is the common region of the LFK and the UFK may be extracted as a prefix. Then, remaining key values obtained by excluding the prefix from key values of a record to be added are added to the key values of the page, or the key values of the page are changed to remaining key values obtained by excluding the prefix from key values of a record to replace the key values of the page. For example, when key values to be added are KR10000:FD0001:SN13000, the prefix is KR10000:FD0001, and thus only the key value SN13000 obtained by excluding the prefix is added to a relevant page.

A process of splitting a page or merging pages during the DB managing method according to an embodiment of the present invention will now be described.

Figure 6:
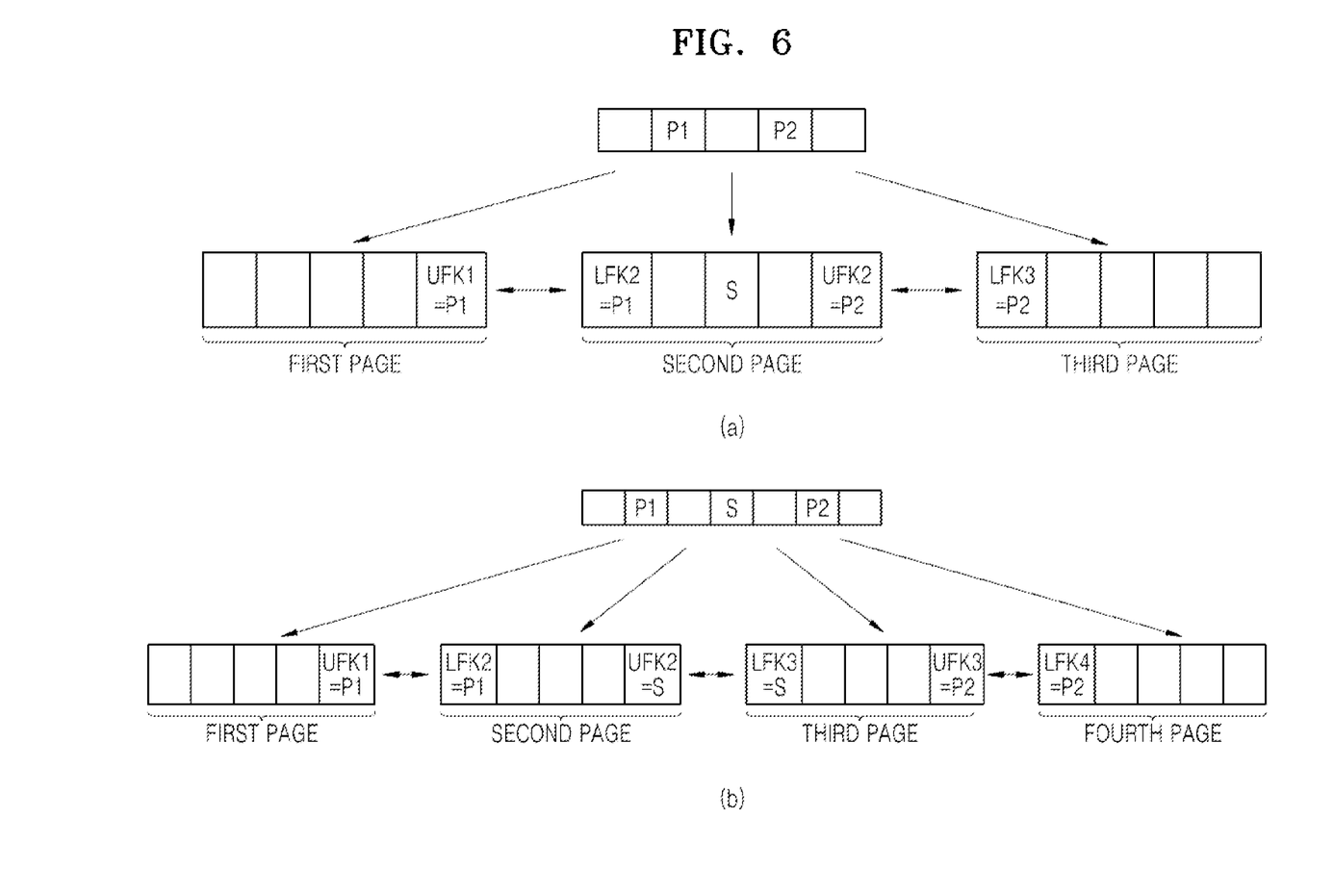

FIGS. 6 (*a*) and (*b*) are diagrams for describing a process of splitting a page in a B tree index to which a DB managing method and system are applied, according to an embodiment of the present invention.

A root node of the B tree index of FIG. 6 (*a*) first has two separation key values, i.e., first and second separation key values P1 and P2. The first separation key value P1 is a separator for separating a first page and a second page, and the second separation key value P2 is a separator for separating the second page and a third page. Also, the first separation key value P1 is an UFK UFK1 of the first page and at the same time, is an LFK LKF2 of the second page. Similarly, the second separation key value P2 is an UFK UFK2 of the second page and at the same time, an LFK LFK3 of the third page.

Here, let's assume that there is no more storage space in the second page and thus the second page needs to be split based on a predetermined value S between the first and second separation key values P1 and P2.

In this case, as shown in FIG. 6 (*b*), the second page stores the predetermined value S that is restored, as a new UFK UFK2. Then, data is compressed again by using the LFK LFK2 that pre-exists, and the UFK UFK2 that is newly generated. In other words, a prefix is extracted by comparing the LFK LFK2 and the UFK UFK2 and only remaining key values obtained by deleting the prefix from key values of records except for the LFK LFK2 and the UFK UFK2 are stored.

Meanwhile, a third page that is newly generated in FIG. 6 (*b*) stores the predetermined value S as an LFK LFK3. Then, the UFK UFK2 of the second page of FIG. 6(*a*) is stored as an UFK UFK3 of the third page of FIG. 6 (*b*). Then, data is compressed again by using the LFK LFK3 and the UFK UFK3 in FIG. 6 (*b*). In other words, a prefix is extracted by comparing the LFK LFK3 and the UFK UFK3 and only remaining key values obtained by deleting the prefix from key values of records except for the LFK LFK3 and the UFK UFK3 are stored.

Lastly, in the third page of FIG. 6 (*b*), the predetermined value S is inserted, as a new separation key value, between the first and second separation key values P1 and P2 of a parent node (herein, a root node).

Meanwhile, although not shown in FIG. 6, if a page is not compressed, i.e., if overlapping data is not deleted from a page by using a prefix, and the page is split based on a new separation key value S, the new separation key value S is set as an UFK in the original page, and data may be newly compressed by using the newly generated UFK and a pre-existing LFK. Meanwhile, in a new page generated by splitting the original page, the new separation key value S is set as an LFK, but since an UFK is not set, data may not be compressed in the new page.

Also, although not shown in FIG. 6, if two neighboring pages are mergeable, i.e., if a sum of the numbers of records stored in the two neighboring pages is less than or equal to a maximum number of records storable in one page, the two neighboring pages may be merged. Here, if the two neighboring pages are both compressed pages, i.e., if overlapping data is deleted from the two neighboring pages by using a prefix, data is newly compressed after merging the two neighboring pages. On the other hand, if even one of the two neighboring pages is not compressed, merging is not performed.

Table 1 below is obtained by comparing a total page count of an index when a general DB managing method and system are applied and a total page count of an index when a DB managing method and system according to one or more embodiments of the present invention are applied. Also, Table 2 below is obtained by comparing an average key length when a general DB managing method and system are applied and an average key length when a DB managing method and system according to one or more embodiments of the present invention are applied.

TABLE 1

| Name of Index | Total Page Count of General Index | Reduction Rate of Page Count of Index when Present Invention is Applied (%) |
| --- | --- | --- |
| PK (primary key) | 4,120,635 | 21 |
| Index 1 | 5,740,191 | 23 |
| Index 2 | 6,056,621 | 18 |
| Index 3 | 6,849,043 | 19 |
| Index 4 | 5,793,081 | 15 |

TABLE 2

| Name of Index | General Average Key Length (bytes) | Reduction Rate of Average Key Length when Present Invention is Applied (%) |
| --- | --- | --- |
| PK (primary key) | 18 | 39 |
| Index 1 | 30 | 33 |
| Index 2 | 32 | 28 |
| Index 3 | 38 | 29 |
| Index 4 | 30 | 27 |

As shown in Tables 1 and 2, the total page count is reduced by about 19% and the average key length is reduced by about 31% when the DB managing method and system according to one or more embodiments of the present invention are applied compared to when the general DB managing method and system are applied. In other words, a space storage may be saved according to one or more embodiments of the present invention, and thus the performance of a DB may be improved.

In the DB managing method according to an embodiment of the present invention, a key value used as a separator of a B tree page in the B tree page is set as a {virtual key-OID} record and added to each of fence keys (an LFK and an UFK) at two ends of the B tree page, and thus a combining process of obtaining original key values based on the LFK and the UFK and a disassembling process of deleting a prefix may be quickly performed.

If an LFK or an UFK does not exist in a page, a record may be stored by using a general method, and thus an index may include both a compressed page (a page wherein a prefix is deleted from each record) and an uncompressed page (a page wherein a prefix is not deleted from each record). Also, a compressed record and an uncompressed record may co-exist in a page having an LFK and an UFK. Accordingly, compression may be dynamically set in run-time regardless of a current state of a B tree. Accordingly, a DB operation efficiency may be improved by adjusting compression to be not performed when an insert/delete load of a certain region is increased.

Meanwhile, since compression using a prefix is determined by using an LKF and an UFK, metadata about a secondary compression method and a range may not be additionally recorded. Accordingly, as a number of records stored in a page increases, a compression efficiency is increased compared to a general method of including meta information to a compressed record.

Since only key values without a prefix are stored according to an embodiment of the present invention, more records may be stored in one page of B tree. Accordingly, since a storage space may be saved, it is highly likely that the storage space is included in a buffer cache of a main memory, and thus the performance of a DB may be increased. Moreover, compared to a general compression method, in the DB managing method according to an embodiment of the present invention, splitting a page and restoring a record are easily performed, lower compatibility is satisfactory since a storage structure is not changed, and a structure of an index is simple since only a flag indicating an LFK and an UFK is added and no other metadata is additionally recorded.

In addition, by using the DB managing method according to an embodiment of the present invention, a validity check may be performed on a leaf node by using an LFK and an UFK of each page whenever a tree structure of an index is traversed, and thus an error of an index structure may be easily determined. Also, since a connection relationship between leaf nodes is determined by using an LFK and an UFK, a link may be removed from the leaf nodes, and thus the performance and efficiency of a structure modification operation (SMO) may be increased.

As described above, according to the one or more of the above embodiments of the present invention, a storage space where pages of an index are stored may be saved, and thus the performance of a DB may be increased.

Also, according to one or more embodiments of the present invention, compression may be set in run-time, and thus a DB operation efficiency may be increased by adjusting compression not to be performed when an insert/delete load in a creation region is increased.

Also, according to one or more embodiments of the present invention, metadata about a secondary compression method and a range may not be additionally recorded, and thus a compression efficiency is increased as a number of records stored in a page increases.

Also, according to one or more embodiments of the present invention, a validity check is performed on a leaf node by using an LFK and an UFK of each page whenever a tree structure of an index is traversed, and thus an error of an index structure may be easily determined.

The DB managing method described above may be written as a program that is executable by using any one of various computers. Here, the program for performing the DB managing method may be stored in a computer-readable recording medium, such as a hard disk, a CD-ROM, a DVD, a ROM, a RAM, or a flash memory.

While one or more embodiments of the present invention have been described with reference to the figures, it will be understood by those of ordinary skill in the art that various changes in form and details may be made therein without departing from the spirit and scope of the present invention as defined by the following claims.

What is claimed is:

1. A method for managing a database (DB) in communication with a computer system, using an index having a plurality of pages, each having a plurality of records, each of the plurality of records comprising an original key value and an object or record identifier providing a pointer to a record in the database, the method comprising:
for each respective page of at least one of the plurality of pages:
generating, by an index manager in the computer system, a lower fence key (LFK) from a lower value of the original key values of the plurality of records included in the respective page and an upper fence key (UFK) from an upper value of the original key values of the plurality of records included in the respective page;
extracting, by the index manager, a common region from each of the original key values of the plurality of records included in the respective page, as a prefix;
excluding the prefix from each of the original key values of the plurality of records in the respective page except for the lower fence key (LFK) and the upper fence key (UFK), to provide remaining parts of the original key values; and
storing, by the index manager, together in the respective page, the generated lower fence key (LFK) the generated upper fence key (UFK) and the provided remaining parts of the original key values, wherein the prefix is included in the stored LFK and UFK, and wherein the provided remaining parts of the original key values are stored in the respective page between the lower fence key (LFK) and the upper fence key (UFK) to provide a compressed page.

2. The DB managing method of claim 1, wherein key values obtained by excluding the prefix from the original key values of the plurality of records are stored in the plurality of records of the at least one of the plurality of compressed pages, except in where the LFK or the UFK are stored.

3. The DB managing method of claim 1, wherein each of the plurality of records is in a multi-column form comprising a plurality of parts of key values.

4. The DB managing method of claim 1, wherein each of the plurality of pages is a leaf node having a B tree or B+ tree structure.

5. The DB managing method of claim 1, further comprising restoring, by the index manager, the original key values of the plurality of records included in each of the at least one compressed page of the plurality of pages,
wherein the restoring comprises:
determining whether a select page is a compressed page, wherein said determining comprises determining whether the LFK and the UFK exist in the select page;
if it is determined that the select page is a compressed page, comparing the LFK and the UFK to extract the prefix between the LFK and the UFK if the LFK and the UFK exist in the select page; and
restoring the original key values by combining the extracted prefix and the remaining part of the original key values of a select record of the select page.

6. The DB managing method of claim 5, wherein, if the LFK and the UFK do not exist in the select page, key values stored in each record of the select page are the original key values.

7. The DB managing method of claim 1, further comprising adding, by the index manager, a new record to a select page or changing, by the index manager, a select record from the select page,
wherein the adding or changing comprises:
determining whether a select page is a compressed page, wherein said determining comprises determining whether the LFK and the UFK exist in the select page;
if it is determined that the select page is a compressed page, comparing the LFK and the UFK to extract the prefix between the LFK and the UFK if the LFK and the UFK exist in the select page; and
adding, to the select page, a remaining part of a key value of the new record obtained by excluding the prefix from the new record to be added, or changing the remaining part of the key value of the select record obtained by excluding the prefix from the select record.

8. The DB managing method of claim 7, wherein, if the LFK and the UFK do not exist in the select page, the new record is added to the select page or the select record of the select page is changed without the prefix being extracted.

9. A non-transitory computer-readable recording medium having recorded thereon a program for executing the DB managing method of claim 1.

10. A database (DB) managing system having a processor for managing a database (DB) in communication with the DB managing system, using an index having a plurality of pages, each having a plurality of records, each of the plurality of records comprising an original key value and an object or record identifier providing a pointer to a record in the database, comprising:
a query analyzer that receives and analyzes a query in which a fetch request for a record included in a certain table in a database and an update request for at least one column included in the record are defined;
an execution plan generator that generates an execution plan for performing the analyzed query;
an execution plan execution unit that executes the execution plan by fetching the record and updating the at least one column according to the execution plan; and
an index manager that comprises an index generator generating, for each respective page of at least one of the plurality of pages, a lower fence key (LFK) from a lower value of the original key values of the plurality of records included in the respective page and an upper fence key (UFK) from an upper value of the original key values of the plurality of records included in the respective page;
wherein the index manager extracts a common region from each of the original key values of the plurality of records included in the at least one of the plurality of pages, as a prefix; excludes the prefix from each of the original key values of the plurality of records in the respective page except for the lower fence key (LFK) and the upper fence key (UFK), to provide remaining parts of the original key values; and stores, together in the respective page, the generated lower fence key (LFK), the generated upper fence key (UFK) and the provided remaining parts of the original key values to provide a compressed page, wherein the prefix is included in the stored LFK and UFK, and wherein the provided remaining parts of the original key values are stored in the respective compressed page between the lower fence key (LFK) and the upper fence key (UFK).

11. The DB managing system of claim 10, wherein the prefix is stored only in the LFK and the UFK.

12. The DB managing system of claim 11, wherein key values obtained by excluding the prefix from the original key values of the plurality of records are stored in the plurality of records of the at least one of the compressed pages, except in where the LFK or the UFK is stored.

13. The DB managing system of claim 10, wherein the index manager further comprises a record restorer that restores the original key values from the plurality of records included in each of the at least one of the compressed pages of the index.

14. The DB managing system of claim 13, wherein the record restorer determines whether a select page is a compressed page, wherein said determining comprises determining whether the LFK and the UFK exist in a select page, if the LFK and the UFK exist in the select page, compares the LFK and the UFK to extract the prefix, and restores the original key values by combining the extracted prefix and the remaining part of the original key values of a select record of the select page.

15. The DB managing system of claim 10, wherein the index manager further comprises a record updater that adds a new record to a select page of the index or changes a select record from the select page.

16. The DB managing system of claim 15, wherein the record updater determines whether a select page is a compressed page, wherein said determining comprises determining the LFK and the UFK exist in the select page, compares the LFK and the UFK to extract the prefix if the LFK and the UFK exist in the relevant page, and adds, to the select page, a remaining part of the key value of the new record obtained by excluding the prefix from the new record to be added, or changes the remaining part of the key value of the select record obtained by excluding the prefix from the select record.

* * * * *